US009553889B1

(12) United States Patent
Kivva et al.

(10) Patent No.: US 9,553,889 B1
(45) Date of Patent: Jan. 24, 2017

(54) SYSTEM AND METHOD OF DETECTING MALICIOUS FILES ON MOBILE DEVICES

(71) Applicant: AO Kaspersky Lab, Moscow (RU)

(72) Inventors: Anton A. Kivva, Moscow (RU); Nikita A. Buchka, Moscow (RU); Mikhail Y. Kuzin, Moscow (RU); Victor V. Chebyshev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/849,044

(22) Filed: Sep. 9, 2015

(30) Foreign Application Priority Data

Jun. 30, 2015 (RU) .................................. 2015125969

(51) Int. Cl.
*G06F 12/14* (2006.01)
*H04L 29/06* (2006.01)
*H04L 29/08* (2006.01)

(52) U.S. Cl.
CPC ............. *H04L 63/145* (2013.01); *H04L 67/10* (2013.01)

(58) Field of Classification Search
CPC .................................................... H04L 63/145
USPC ..................................................... 726/22–25
See application file for complete search history.

(56) References Cited

U.S. PATENT DOCUMENTS

| 8,266,698 | B1 | 9/2012 | Seshardi et al. |
| 8,370,931 | B1 | 2/2013 | Chien et al. |
| 8,826,439 | B1* | 9/2014 | Hu .................. G06F 21/563 726/24 |
| 2006/0230453 | A1* | 10/2006 | Flynn ................ G06F 21/125 726/24 |
| 2007/0089171 | A1 | 4/2007 | Aharon et al. |
| 2012/0072988 | A1 | 3/2012 | Agrawal |

OTHER PUBLICATIONS

Bruschi et al. "Using Code Normalization for Fighting Self-Mutating Malware", Rapporto Tecnico N. 8-06, Mar. 1, 2006, pp. 1-14.
Weber et al. "A Toolkit for Detecting and Analyzing Malicious Software" Computer Security Applications Conference, 2002, Dec. 9, 2002, pp. 423-431.
Extended European Search Report for corresponding European Application No. 15191195.5 date of mailing Apr. 4, 2016.

* cited by examiner

*Primary Examiner* — Alexander Lagor
(74) *Attorney, Agent, or Firm* — Arent Fox LLP; Michael Fainberg (57) ABSTRACT

Disclosed are system, method and computer program product for detecting malicious files on mobile devices. An example method includes: analyzing a file to identify classes and methods contained in said classes; identifying a bytecode array for each identified method; determining instructions contained in each method by identifying a corresponding operation code from the bytecode array of each method; dividing the determined instructions for each method into a plurality of groups based on similarity of functionality among said instructions; forming a vector for each method on the basis of the results of the division of the instructions into the plurality of groups; comparing the formed vectors with a plurality of vectors of known malicious files to determine a degree of similarity between the compared vectors; and determining whether the analyzed file is malicious or clean based on the degree of similarity between the compared vectors.

18 Claims, 7 Drawing Sheets

Table 1

| Command offset in the method code | Command code (hex representation of machine code) | Description of command | |
|---|---|---|---|
| .0000: | 6E 10 3F 00 03 00 | invoke-virtual | int com/software/skype/Actor$1::getResultCode() imp. |
| .0006: | 0A 01 | move-result | |
| .0008: | 2B 01 34 00 00 00 | packed-switch | |
| .000E: | 54 31 02 00 | iget-object | |
| .0012: | 71 10 48 00 01 00 | invoke-static | void com/software/skype/Actor::access$5(ref) |
| .0018: | 0E 00 | return-void | |
| .001A: | 54 31 02 00 | iget-object | |
| .001E: | 71 10 43 00 01 00 | invoke-static | int com/software/skype/Actor::access$0(ref) |
| .0024: | 0A 02 | move-result | |
| .0026: | D8 02 02 01 | add-int/lit8 | |
| .002A: | 71 20 44 00 21 00 | invoke-static | void com/software/skype/Actor::access$1(ref, int) |
| .0030: | 54 31 02 00 | iget-object | |
| .0034: | 71 10 45 00 01 00 | invoke-static | ref com/software/skype/Actor::access$2(ref) |
| .003A: | 0C 01 | move-result-object | |
| .003C: | 71 00 46 00 00 00 | invoke-static | ref com/software/skype/Actor::access$3() |
| .0042: | 0C 02 | move-result-object | |
| .0044: | 6E 20 CC 00 21 00 | invoke-virtual | ref java/util/HashMap::get(ref) imp. |
| .004A: | 0C 01 | move-result-object | |
| .004C: | 1F 01 33 00 | check-cast | |
| .0050: | 52 10 6F 00 | iget | |
| .0054: | 54 31 02 00 | iget-object | |
| .0058: | 71 10 43 00 01 00 | invoke-static | int com/software/skype/Actor::access$0(ref) |
| .005E: | 0A 01 | move-result | |
| .0060: | 33 10 DC FF | if-ne | |
| .0064: | 54 31 02 00 | iget-object | |
| .0068: | 71 10 47 00 01 00 | invoke-static | void com/software/skype/Actor::access$4(ref) |
| .006E: | 28 D5 | goto | |
| .0070: | [SKIPPED] | packed-switch-payload | |

SYSTEM AND METHOD OF DETECTING MALICIOUS FILES ON MOBILE DEVICES

CROSS-REFERENCE TO RELATED APPLICATIONS

This application claims benefit of priority under 35 U.S.C. 119(a)-(d) to a Russian Application No. 2015125969 filed on Jun. 30, 2015, which is incorporated by reference herein.

FIELD OF TECHNOLOGY

The present disclosure relates generally to the field of computer security and more specifically to a system and method of detecting malicious files on a mobile device.

BACKGROUND

Mobile computing devices (hereinafter, mobile devices) have become an indispensable part of life in modern society. Examples of such devices are mobile telephones, smartphones, personal communicators, tablet computers and notebooks. The majority of mobile devices generally contain various user data needed for everyday routines. Such data might be private (such as photographs and video), personal (such as full name, year of birth, telephone numbers), and confidential (such as the login and password to a bank site, credit card number).

One of the most popular mobile platforms used on mobile devices is the operating system Google Android (Android OS). First and foremost, the Android OS has won its popularity due to its open and free nature, resulting in its widespread use on various hardware platforms and, as a consequence, a tremendous number of different applications has been developed by those wanting to work under the Android OS. At present, several million applications have already been created for the Android OS and have been installed on more than one billion mobile devices around the world. At the same time, increasingly many malicious programs were created for mobile devices using the Android OS. The term "malicious programs for mobile devices" generally includes any software designed to gain unauthorized access to the computing, resources of mobile devices or to the information being stored thereon for the purpose of unauthorized use of the resources or inflicting harm on (causing loss to) the owners of the mobile devices by copying, distorting, removing or replacing information. The term "information" generally includes information about user contacts or credit cards and access to various applications and websites. The term "unauthorized use" generally includes actions performed without authorization and/or knowledge of mobile device owner, such as making of unwanted electronic payments, sending of electronic messages containing spam, and making of telephone calls. Therefore, since the applications installed on mobile devices more or less have access to "important" data of the users, it has become important to protect mobile devices and their applications against malicious programs.

The majority of existing solutions for the protection of mobile devices are essentially adapted antivirus programs from personal computers using the Windows operating system. Such antivirus programs encounter a number of difficulties when employed on mobile devices. First of all, the malicious actions are different on a mobile device than on a PC, which requires a corresponding adaptation of the technologies of the antivirus programs. Secondly, on a mobile device the actions being carried out by malicious programs are generally realized through API functions, and since each mobile platform (such as the OS on the Linux kernel, the Android OS, the Apple OS (IOS) or the Bada OS) has its own API functions, an optimization is also correspondingly required for each platform, which may result in complicating the working of the antivirus program. Consequently, this must also be taken into account when searching for malicious files and performing an antivirus check. Thirdly, the antivirus programs intended for mobile devices have limitations in the use of the system resources of the mobile devices, such as the battery, the central processing unit (CPU), and the memory (e.g., the OS itself limits access to the resources). In order to resolve these difficulties, specialized antivirus programs needed that would take account of the special features of mobile platforms.

Moreover, malicious programs also do not stay still. At present, there are more and more programs for mobile platforms, particularly Trojan horse programs, which use technologies of polymorphism (adding/changing instructions in a file without altering the actual functionality), metamorphism (complete alteration of the virus body without altering its functionality, a much more complicated form of polymorphism), and obfuscation of program code. Obfuscation means a change in the original text or the executable code of a program to a form which retains its functionality, but resists an analysis, an understanding of the working algorithms, and a modification during decompilation. These technologies make it possible to hide the executable code of the malware and change it to a form retaining the functionality of the code, but resisting antivirus analysis and hiding working of its algorithm.

Also, one of the main techniques of execution of mobile applications in the Android OS is the Dalvik virtual machine. One peculiarity of executable files of the Dalvik executable format (hereinafter, DEX file) is that part of the code in the file can change place without loss of the execution logic. It should be noted that another technique of executing mobile applications is the Android Runtime environment, which also has the aforementioned features. Thus, technologies which use the classical malware detection methods of search for code similarities (e.g., line patterns or analysis of behavior of applications) have little effect against such malicious files, and the above-presented antivirus methods are not able to reveal such malicious programs (files). Therefore, a more effective method is needed for determining similarity of files.

Thus, a new principle of analysis and identification of malicious programs is needed, which could be adapted to mobile platforms, especially to the Android mobile platform, and at the same time is resistant to the technologies of polymorphism and program code obfuscation.

SUMMARY

Disclosed systems, methods and computer program products for detection of malicious files on mobile devices. An exemplary method comprises: analyzing, by a hardware processor, a file to identify at least one or more classes and one or more methods contained in said one or more classes; identifying, by the hardware processor, a bytecode array for each identified method; determining, by the hardware processor, instructions contained in each method by identifying a corresponding operation code from the bytecode array of each method; dividing, by the hardware processor, the determined instructions for each method into a plurality of groups based on similarity of functionality among said instructions; forming, by the hardware processor, a vector for each method on the basis of the results of the division of the instructions into the plurality of groups; comparing, by the hardware processor, the formed vectors for the methods of the analyzed file with a plurality of vectors of known malicious files stored in a database to determine a degree of similarity between the compared vectors; and determining, by the hardware processor, whether the analyzed file is malicious or clean based on the degree of similarity between the compared vectors.

In one exemplary aspect, the step of analyzing a file includes one or more of disassembling and decompiling the file.

In one exemplary aspect, the instructions are divided into groups on the basis of semantic values of the bytecode arrays.

In one exemplary aspect, the plurality of groups include one or more groups of: instructions having no logical meaning, instructions that work with constants, instructions that work with fields, instructions that pertain to calls or intercepts.

In one exemplary aspect, the steep of comparing vectors includes comparing the distance between their two associated points in n-dimensional Euclidean space.

In one exemplary aspect, the step of comparing vectors includes performing one or more of: excluding from the comparison classes and methods belonging to standard library packages; excluding from the comparison classes not containing a single method; excluding from the comparison methods containing two instructions or less; excluding from further comparison files whose vectors are saved in the database if the comparison of the overall number of classes and methods of these files with the overall number of classes and methods of the file being checked differs by more than 25%; excluding from the comparison classes or methods of the files being compared from further comparison if the size of the classes or methods being compared differs by more than 25%; and excluding from the comparison the vectors of methods only contained in a single class.

An exemplary system for detecting malicious files comprises: a hardware processor configured to: analyze a file to identify at least one or more classes and one or more methods contained in said one or more classes; identify a bytecode array for each identified method; determine instructions contained in each method by identifying a corresponding operation code from the bytecode array of each method; divide the determined instructions for each method into a plurality of groups based on similarity of functionality among said instructions; form a vector for each method on the basis of the results of the division of the instructions into the plurality of groups; compare the formed vectors for the methods of the analyzed file with a plurality of vectors of known malicious files stored in a database to determine a degree of similarity between the compared vectors; and determine whether the analyzed file is malicious or clean based on the degree of similarity between the compared vectors.

An exemplary non-transitory computer readable medium storing computer executable instructions for detecting malicious files includes instructions for: analyzing a file to identify at least one or more classes and one or more methods contained in said one or more classes; identifying a bytecode array for each identified method; determining instructions contained in each method by identifying a corresponding operation code from the bytecode array of each method; dividing the determined instructions for each method into a plurality of groups based on similarity of functionality among said instructions, forming a vector for each method on the basis of the results of the division of the instructions into the plurality of groups; comparing the formed vectors for the methods of the analyzed file with a plurality of vectors of known malicious files stored in a database to determine a degree of similarity between the compared vectors; and determining whether the analyzed file is malicious or clean based on the degree of similarity between the compared vectors.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for detection of malicious files on mobile devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Exemplary aspects of the system, method, and computer program product for detection of malicious files on mobile devices will be described herein in the context of Android OS. However, those of ordinary skill in the art will appreciate that these aspects can be readily adapted to other mobile operating systems and platforms. The peculiarities of applications executed in the Android OS will be consider first. When creating an application for the Android OS, a file is composed of Android Pack format (hereinafter, an arc file), which is essentially an archive. An archive generally contains the following files: the "META-INF" directory, the "res" directory, the file "AndroidManifest.xml", the file "classes.dex" and the file "resources.arsc".

The META-INF directory, in turn, contains the file CERT.RSA, which is the certificate of the application, the file CERT.SF, which contains the checksums of the resource files (such as pictures, sounds, and so on), and the file MANIFEST.MF, which contains service information describing the apk-file itself. In other words, this folder contains the signature files of the application certifying said application by the developer company.

The "res" folder contains various resource files, which make it possible to display an interface and pictures and to reproduce the tunes of the application, for example.

The file "AndroidManifest.xml" is the so-called "passport of the apk application". This file contains general information on the application, including the service information needed for the working of the application, such as information on access to the network or contacts.

The file "resources.arsc" is a table of resources. The file contains descriptions of all the resources in the form of XML hypertext (Extensible Markup Language).

The file "classes.dex" is an executable file of Dalvik Executable format (hereinafter, DEX), which contains the bytecode and service information needed for working in the virtual machine Dalvik (hereinafter, VMD). It should be noted that the VMD is the primary method of execution of applications in the Android OS. The attributes of the DEX format are such that it is possible to obtain complete information on the structural elements of a program (e.g., the classes, methods, fields, exception handlers, and so on), as well as associate these elements with the bytecode determining their behavior.

Figure 1A:
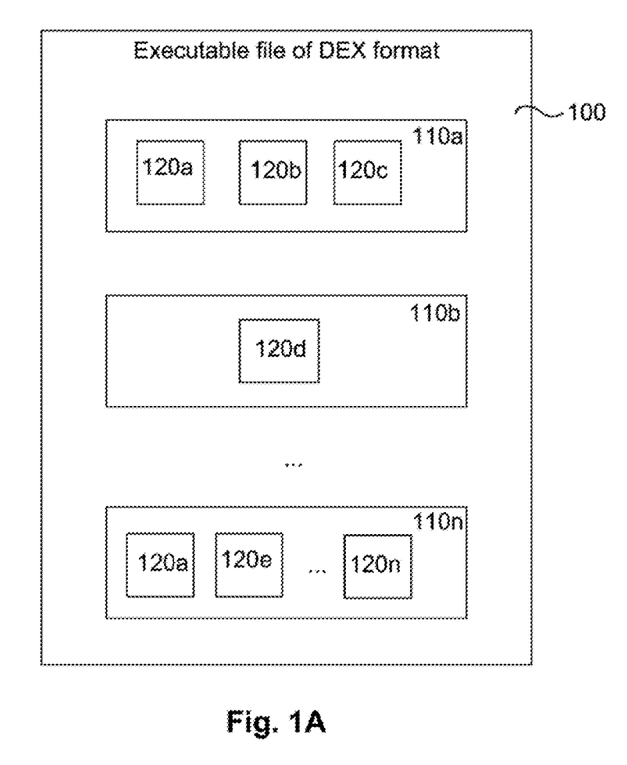
FIG. 1A illustrates an exemplary structural diagram of an executable file of DEX format.

FIG. 1A shows a structural diagram of a DEX file 100, showing the parts of the structural elements of the file. The file of DEX format 100 consists of classes 110$a$ . . . 110$n$. In object-oriented programming, class means a variety of an abstract type of data, which is characterized by the method of its construction. In turn, an abstract type of data means a type of data which provides a certain set of methods 120$a$ . . . 120$n$ for working with elements of the corresponding type, and also the ability to establish (form) elements of this type with the aid of special (other) methods. The number of classes 110 and methods 120 for each file of DEX format 100 varies according to the goals and tasks of the corresponding application. Each method includes VMD instructions. The format of a VMD instruction can be presented in the following form:

| OPCODE | REGISTERS\|ARGUMENTS |
|---|---|

Figure 1B:
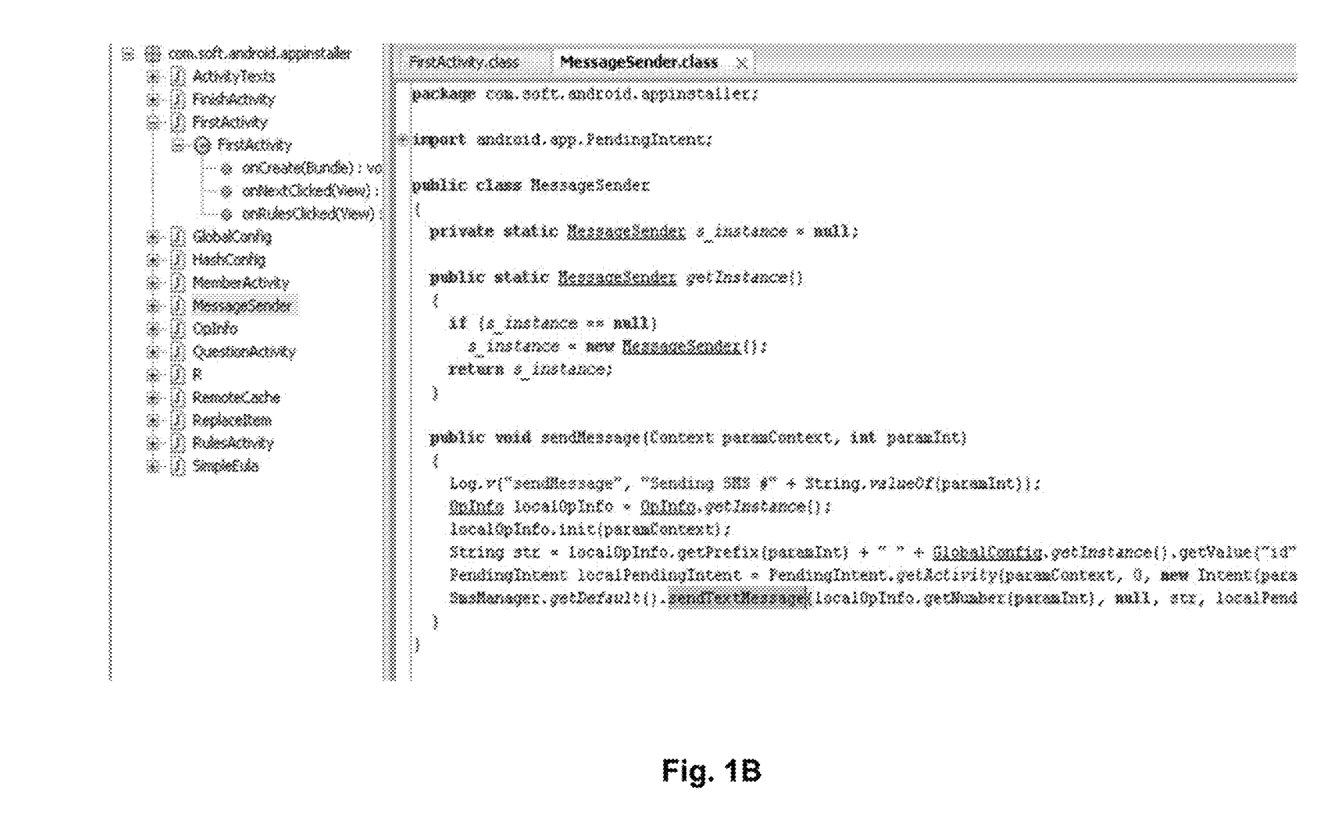
FIG. 1B illustrates an example of an executable file of DEX format.

As can be seen, the instruction is divided into two parts, where the first part contains operation code ("OPCODE") of the instruction. The second part contains the arguments of the instruction and defines the registers and other parameters being used by the instruction (such as the values for the registers). An example of the source code of an executable file of DEX format is shown in FIG. 1B. Depicted is a package "com.soft.android.appinstaller", whose source code will be used to construct a file of DEX format, whose classes are presented in the form of a treelike structure (ActivityTexts, FinishActivity and so on). Moreover, the instructions of the class "MessageSender" is shown in FIG. 1B at the right. It should be noted that each method essentially contains a certain number of commands for executing its purpose and has a set of input arguments. Therefore, for each method of a class in the file of DEX format one can define a corresponding bytecode array (e.g., set of instructions).

In one example aspect, the method for detection of malicious files compares files of DEX format on the basis of a comparison of the functionality of the structural elements of the programs (such as methods and classes) contained in said files. Such an approach overcomes the drawbacks of known methods of binary and line-by-line comparison of files for files of DEX format. One of the drawbacks is that a binary comparison, which presupposes a single bytecode order, is circumvented by changing the order of the bytecode array. Another drawback is that a line-by-line comparison does not work when lines of equal size are encrypted.

Figure 2:
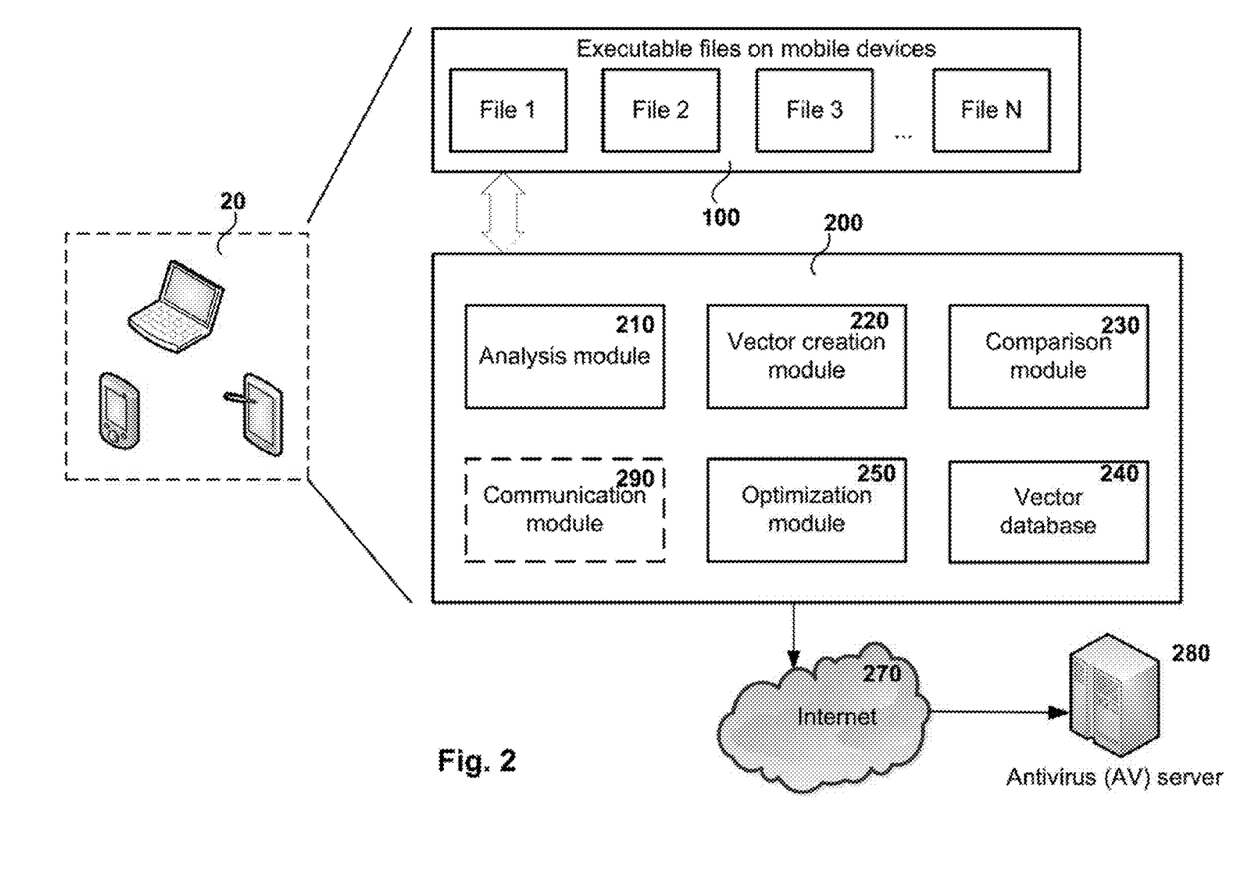
FIG. 2 illustrates an exemplary system of detecting a malicious file on mobile devices.

FIG. 2 shows an exemplary system of detecting malicious files on mobile devices, such as Android OS based devices (hereinafter, for brevity, the detection system). As depicted, the detection system 200 may be installed on a mobile device 20 for detecting malicious files. It should be noted that a mobile device is a particular instance of a computer system, as one described in FIG. 6, but may also include mobile telephones, smartphones, personal communicators or tablet computers which use the Android OS. Accordingly, executable files on mobile devices which require an antivirus protection are generally executable files of DEX format 100, such as file 1, file 2, file 3 and file N, each of which is a file 100. Accordingly, before running each file 100, the detection system 200 may perform antivirus check of files 100.

In one example aspect, the detection system 200 includes at least an analysis module 210, a vector creation module 220, a comparison module 230 and a vector database 240. Likewise, in one exemplary aspect, the detection system 200 includes an optimization module 250. Moreover, the detection module 200 can have a connection to a remote server, such as an antivirus server 280. The connection to the server 280 will occur, for example, via the Internet 270. The antivirus server 280 can have different purposes, including in one exemplary aspect providing the functions of the analysis module 210, the vector creation means 220 and the comparison module 230. In this case, the analysis module 210, vector creation module 220 and comparison module 230 can partly or fully redirect their tasks to the corresponding modules on the antivirus server 280. Then, the analysis module 210, vector creation module 220 and comparison module 230 will function as monitoring means, sending and receiving the necessary information for the working of the detection system 200. In yet another exemplary aspect, the aforementioned modules 210, 220, 230, 240 and 250 can be located on a remote server 280, and then a communication module 290 may perform the task of interacting between said modules and the mobile device 20. For example, the communication module 290 will transmit files which need to have an antivirus check performed on them, or data on the file which is sufficient to perform an antivirus check (such as the hash sum of the file). Thus, the detection system 200 in one example aspect can be a distributed detection system.

Hence, the analysis module 210 performs an analysis of the file being checked 100 in order to identify information about the file contents, especially the classes and the methods contained in the identified classes. In one exemplary aspect, analysis module 210 is configured to take apart the file by disassembling it, for the purpose of converting the executable code of the file into the source code of the program. After this, the content (structure) of the file is determined, namely, information about the methods and the classes. For the disassembly of the file, the module 210 may be or contain a disassembler functionality. In another exemplary aspect, the taking-apart of the file may be accomplished by file decompilation. For the decompilation of the file, the analysis module 210 may be or contain a file decompiler functionality, designed to take apart files of DEX format, such as the decompiler "ApkTool".

Next, for each class method identified, the analysis module 210 may determine the corresponding bytecode array (sequential set of instructions). Basically, a bytecode array is a representation of a particular method in the codes of the virtual machine. Having determined the bytecode array, the analysis module 210 may break up the given array into instructions (commands). In this way, a "functional map" is formed for each method of each class of the file being analyzed. When the analysis module 210 is breaking up an array into instructions and determination of bytecode, the module 210 is basically performing the function of an instructions length disassembler for applications (files) of DEX format.

Next, the analysis module 210 may forward the identified information, namely, the methods and their corresponding instructions with corresponding bytecodes, to the vector creation module 220. It should be noted that, for example in event of finding an absence of at least one method from a class, the class can be considered to be unimportant. In yet another exemplary aspect, if a method will contain fewer than two instructions (commands), that method can also be considered unimportant. It should be noted that, when a class or method is determined to be unimportant, this means that they may be excluded from further analysis according to one exemplary aspect. This optimization makes it possible to increase the speed of the further analysis and reduce the level of false positive detections.

Figure 5:
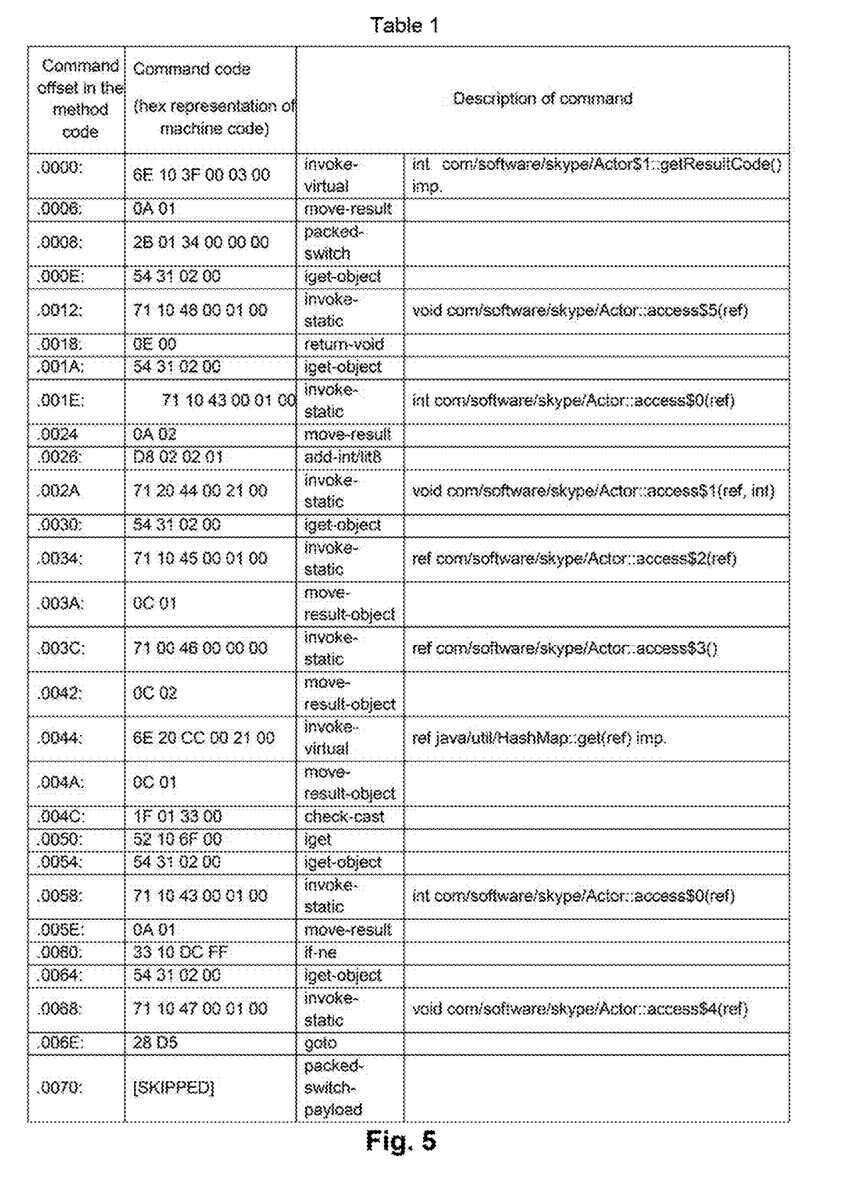
FIG. 5 illustrates a table containing an exemplary code of the "onReceive" method which is used to generate a vector for the method.

In one exemplary aspect, the vector creation module 220 is configured to form a vector for each method (including for the methods of the file being checked) on the basis of information received from the analysis module 210, namely, on the basis of the analysis of the bytecode of each method. The principle of formation of the vector will be presented next using as example formation of a vector for the "onReceive" method. The code of the "onReceive" method, broken up into lines, is presented in Table 1 in FIG. 5. As can be seen from Table 1, each line constitutes an instruction code for the VMD by a corresponding offset with its arguments and registers. When forming the vector for the method, the vector creation module 220 selects only the first bytes of the instruction, which determine the action being performed by the instruction. In other words, we select the "OPCODE" of the instruction, which is generally characterized by the first code byte. According to Table 1, the first byte will be the first two digits of the machine code, namely, 6E for the first line per offset 0000, 0A for the second line per offset 0006, and so on. Thus, the following bytes will be selected: 6E, 0A, 28, 54, 71, 0E, 54, 71, 0A, D8, 71, 54, 71, 0C, 71, 0C, 6E, 0C, 1F, 52, 54, 71, 0A, 33, 54, 71 and 28.

Next, the vector creation module 220 counts the number of instructions belonging to a particular functional group. The determination of the affiliation of a particular instruction to a corresponding functional group (hereinafter, group) can be done, for example, using a table of correspondences, an example of which is Table 2. According to Table 2, the affiliation of an instruction to a particular group can be determined by the opcode of the instruction.

TABLE 2

| Group | Opcodes of instructions |
| --- | --- |
| Group 1 | Opcodo 1, opcode 2, opcode 5, . . . , opcode N |
| Group 2 | opcode 3, opcode 6, opcode 8, . . . , opcode K |
| Group 3 | opcode 4, opcode 7, oprode 9, . . . , opcode L |
| . . . | . . . |
| Group n | opcode 10, opcode 11, opcode 12, . . . , opcode M |

For example, for the "onReceive" method, the control transfer group (in other words, the group of "Invoke" calls) or group 1 includes the opcodes of instructions such as 6E and 71. Thus, the vector creation module 220 breaks up the entire set of instructions into n groups based, for example, on similarities of their functionality (in according to the semantic values of the opcode of the instructions). It should be noted that the groups among which the instructions (commands) will later be distributed can be created either automatically or specified in advance with the help of the user. Examples of such groups can be the following: a group of instructions having no logical meaning (such as an instruction to transfer data between registers), a group of instructions for working with constants, a group of instructions for working with fields, a group of instructions for calls, intercepts and/or control transfer.

After dividing all instructions into groups, the vector creation module 220 for example can present each method in the form of a vector (point) in n-dimensional Euclidean space;

$$F(M) = \{x_0, x_1, \ldots, x_k\}, k = dim(M),$$

where $x \in OPCODE$ $$m = \left( \sum_{x_i \in r_0}^{k} F(M), \sum_{x_i \in r_1}^{k} F(M), \ldots, \sum_{x_i \in r_n}^{k} F(M) \right),$$

where M is a method,
F(M) is the functional map of the method,
m is a point in n-dimensional space corresponding to the method, and $\overline{\gamma_0, \gamma_n}$ is the partitioning of the opcodes by their semantic value in accordance with the specified groups.

In other words, when forming the vector, the number of commands in the group determines the coordinate of the vector along the corresponding axis. The vectors formed for the methods of all determined classes of the file under analysis are sent by the vector creation module 220 to the comparison module 230.

In one exemplary aspect, the vector creation module 220, before forming the vectors directly, may identify and excludes from further checking the classes and methods which pertain to standard library packages (e.g., they are part of a software development kit). For example, this is done on the basis of the determination of the affiliation of the bytecode (opcode) of the methods and/or classes to standard library packages.

In one exemplary aspect, the comparison module 230 performs comparisons of files with the help of the formed vectors of the methods of the file being checked with the vectors of the methods of files stored in the vector database 240. With the aid of the obtained representation of the vectors of the methods of the files, the comparison module 230 produces a count (representation) of the degree of difference between the two closest methods of the files being compared as the distance between their two associated points in n-dimensional Euclidean space. In other words, for each point one finds the closest point of another method of another file, and the distance is determined. In a particular aspect, for the comparison the module 230 can use the Levenshtein algorithm or any analogous algorithm.

Thus, for example, the distance for the methods p and q can be calculated with the formula:

$$diff = \sqrt{\sum_{k=0}^{n} (p_k - q_k)^2},$$

where diff is the distance between the two associated points.

Thus, a certain distance "diff" (degree of difference) is determined, which is then normalized to the length (the total number of commands) of the formed vector. The methods being compared are considered to be more similar the lesser their normalized degree of difference. The degree of difference lies in the interval between zero and unity.

Next, the comparison module 230 pronounces a verdict on the similarity of the file of DEX format 100 being checked with files whose vectors are being stored in the vector database 240. After this, the comparison module 230 determines whether the file of DEX format 100 being checked is malicious with the help of the identified most similar file. In the event that the most similar file is a malicious file, the file being checked is also deemed to be malicious. Otherwise, if the most similar file is a clean file (not malicious), the file being checked is also deemed to be clean. Information about the maliciousness of one file or another is also stored in the vector database 240.

Even so, it should be noted that, when determining the degree of similarity of files, one first makes a comparison of their methods, then a comparison of their classes, and makes a final decision. Thus, in a particular aspect, if methods are less than 50% similar to each other, it will be deemed that the methods are not at all similar. In a given case, the similarity of methods may be determined by the sum of instructions (opcodes) contained in them. Consequently, the more identical the opcodes, the more similar the methods will be. Also, if the classes differ by more than 10%, the classes will be different. In a given case, the similarity of classes may be determined by the sum (number) of methods contained in them.

The normalized degree of difference may be calculated by the formula:

$$diff = \begin{cases} diff, & diff < \overline{p}, \\ \overline{p}, & diff \geq \overline{p}. \end{cases}$$

$$diff_n = \frac{diff}{\overline{p}}$$

Moreover, in order to increase the accuracy of the determination of the degree of similarity of files in different exemplary aspects, the optimization module 250 can perform an optimization of the vectors of the methods stored in the vector database 240 prior to comparing them with the vectors of the methods of the file being checked, and/or perform optimization directly at the moment of comparing the two files.

In one example aspect, the optimization module 250 is configured to perform the optimization by making a comparison not of all methods (more precisely, their vectors) with each other, but only the closest ones. For this, the methods may be sorted in increasing order. The sorting can be done in accordance with the number (sum) of instructions of each method.

In one example aspect, the optimization module 250 is configured to perform the optimization by comparing methods only within similar classes, for example. Consequently, before comparing the methods, module 250 compares the classes as well. For example, if the classes satisfy the coefficient of similarity assigned to them, the methods of the corresponding classes will be compared. The coefficient of similarity of the classes can be calculated, for example, by comparing the number (sum) of methods contained in each class. Moreover, the selection of which classes to compare with each other and which methods within the classes should likewise be compared with each other can be based on a comparison of the sizes (sums) of the corresponding methods and classes. The size, as mentioned previously, can be determined by adding up the number of methods for the classes and adding up the number of instructions for the methods. Thus, for example, if the size differs by more than 25% when comparing the classes or methods, no further analysis of them will be performed. Otherwise, if the size differs by less than 25%, they will be compared.

In one exemplary aspect, the comparison module 230 may also perform a preliminary comparison of the files before the complete comparison. In this case, the total number of classes and methods of each file may be compared. If the file from the vector database 240 differs from the current file being checked by not more than 25% in either direction, a further comparison of the files will be done. Otherwise, the comparison module 230 will pronounce a verdict that the files are different from each other.

Yet in another example aspect, the optimization module 250 is configured to perform optimization by limiting the number of vectors (points) being compared. For example, the limitation can be established by a certain range in n-dimensional Euclidean space, such that only vectors (points) will be compared which fall within this range. In a particular aspect, the range is determined on the basis of the sum of the coordinates of all points.

It should be noted that the mentioned preliminary optimization makes it possible to increase the speed of the comparison of files and, consequently, the speed of the checking of files 100 and detecting of malicious files amongst them.

Figure 3:
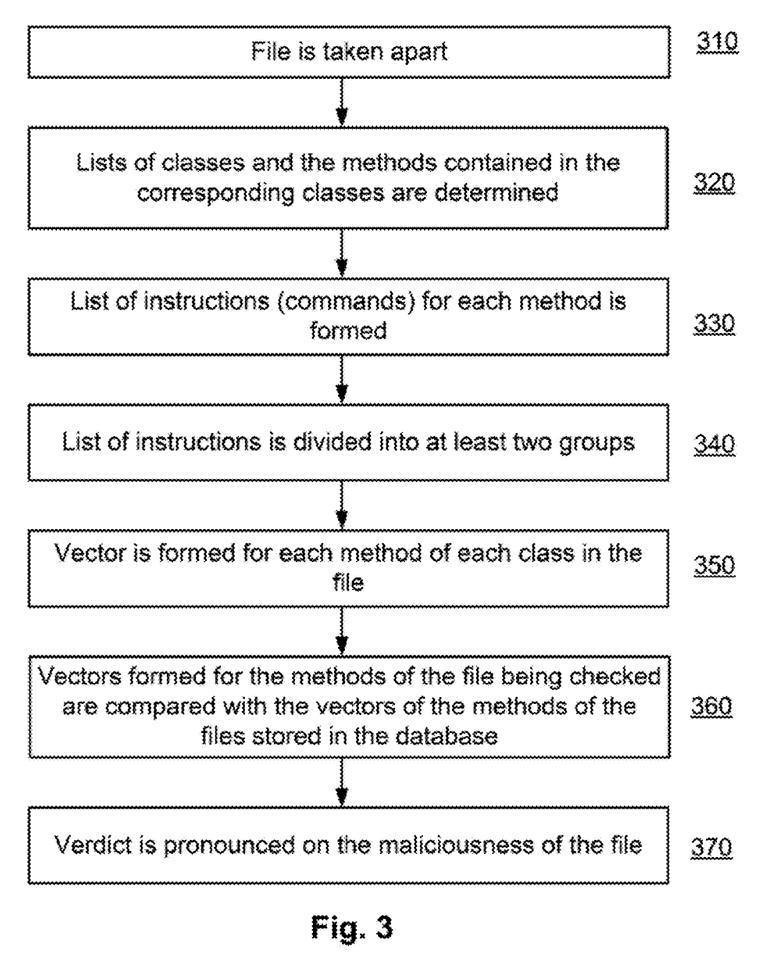
FIG. 3 illustrates an exemplary algorithm for detecting malicious files among the executable files of DEX format on mobile devices.

FIG. 3 shows an exemplary method of detecting a malicious file on mobile devices. Generally, during the performance of the antivirus check of an executable file on the mobile device 20, the file is compared with known malicious files. For this, in step 310, the analysis module 210 takes the analyzed file apart. During the decompilation, in step 320, the analysis module 210 identifies information about the structure of the file, in particular, a list of classes and the methods contained in the identified classes. In step 330, the analysis module 210 forms a list of the instructions (commands) for each identified method. For this, the corresponding bytecode array (set of commands) is determined for each method identified. The bytecode array is the representation of a particular method in machine code. Having selected the bytecode array for each method, said array is broken up into individual instructions (commands) with their own bytecode. Thus, a functional map is formed for each method of each class of the file being analyzed, containing a list of instructions with a corresponding bytecode.

In step 340, the vector creation module 220 divides the list of instructions into at least two groups. It should be noted that the attribute for determining the type of groups and the number thereof can be specified in advance or dictated automatically. Thus, for example, the groups can be created according to the semantic value of the opcode (on similarities of their functionality). Examples of such groups can be the following: a group describing instructions having no logical meaning whatsoever (such as an instruction to transfer data between registers), a group describing instructions for working with constants, a group for working with fields, a group of calls and/or a group of transfers. The principle of division into groups is based on performing the bytecode analysis for each instruction, during which the first bytes pertaining to the opcode of the instruction are extracted. An example of the principle of division is presented with the description of FIG. 2.

After the breaking up into groups, in step 350, the vector creation module 220 forms a vector for each method. Thus, when forming the vector the number of commands in each group determines the coordinate of the vector along the corresponding axis. Thus, each method is represented in the form of a vector (point) in n-dimensional Euclidean space, where the dimensionality of the space is equal to the number of groups.

In step 360, the comparison module 230 compares the files with the help of the formed vectors for the file being checked with the vectors of files stored in the vector database storage means 240. During the comparison, the degree of difference is calculated between the two closest methods of the files being compared as the distance between their two associated points in n-dimensional Euclidean space. In other words, for each point there is found the closest point of another method of another file, and the distance between the points is determined. An example of the calculation of the distance is presented with the description of FIG. 2. Thus, the distance is determined and then normalized to the length (the total number of commands) of the formed vector. An example of the calculation of the normalized degree of difference is presented with the description of FIG. 2. The methods being compared are considered to be more similar the lesser their normalized degree of difference. The degree of difference lies in the interval between zero and unity.

Next, in step 370, a verdict is pronounced on the similarity of the file of DEX format 100 being checked with files whose vectors are being stored in the vector database 240. After this, it is determined whether the file 100 being checked is malicious with the help of the identified most similar file, as indicated in the description of FIG. 2. It should be noted that the coefficient of similarity beyond which it is possible to pronounce a verdict on the maliciousness of a file for not) is determined (or designated) in dependence on the level of security required on the mobile device 20.

Even so, the sequence of determining the degree of similarity of files can look like this first a comparison of methods is done, then a comparison of classes, and then a final decision on the similarity. The comparison of the methods may be done by calculating the sum of instructions contained in each method, and the comparison of classes may be done on the basis of the calculation of the sum of the methods contained in each class. In a particular aspect, if the methods are less than 50% similar to each other, it will be deemed that the methods are not similar. If the classes differ by more than 10%, the classes will be different.

Figure 4:
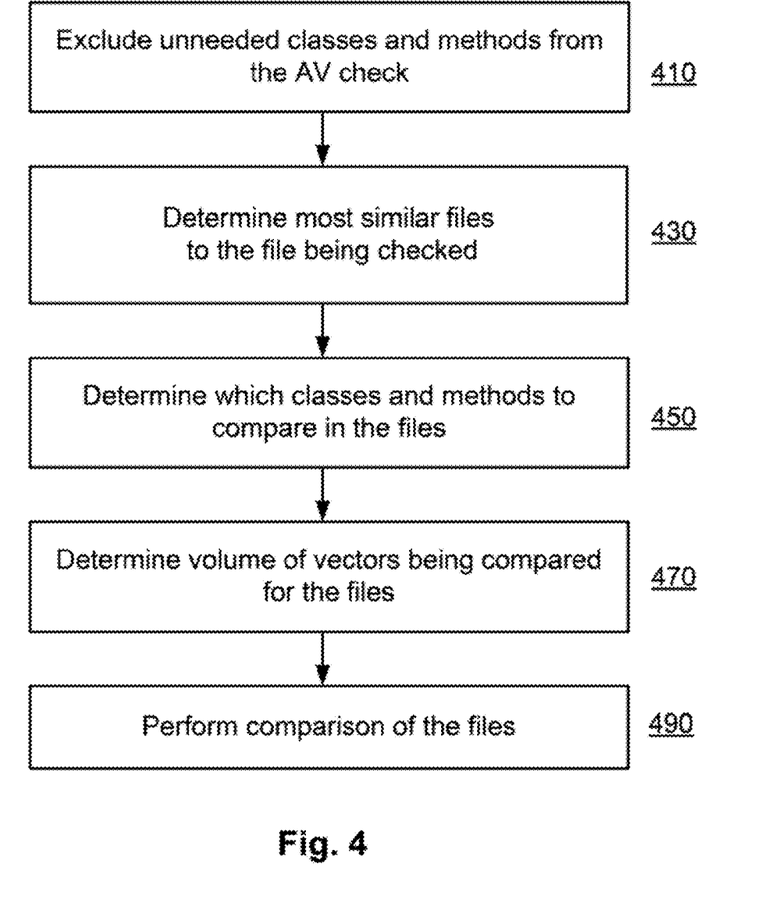
FIG. 4 illustrates an exemplary algorithm for increasing the accuracy of determination of the degree of similarity of files.

FIG. 4 shown an exemplary algorithm for increasing the accuracy in determining the degree of similarity of files. To increase the accuracy of the determination of the degree of similarity of files, the optimization module 250 may perform optimization of the database of the method vectors stored in the vector database 240 prior to their comparison with the vectors of the methods of the file being checked, or at the moment of comparing two files.

Thus, in step 410, before immediately forming the vectors for the file being compared, the optimization module 250 may identify and exclude from further checking the classes and methods which belong to standard library packages (e.g., parts of a software development kit). Moreover, if at least one unimportant method is found in any given class, the class may be considered unimportant. Likewise, if a method contains less than two instructions (commands), that method may be considered unimportant.

Then, during the comparison of the files, an optimization is performed for the files being compared such that the comparison is only done for the most similar files and their methods. Accordingly, in step 430, the files are found which are the most similar to the file being checked. For this, the optimization module 250 compares the total number of classes and methods of each file. If the file from the vector database 240 differs by not more than 25% in either direction from the current file being checked, a further comparison will be done with that file. Otherwise, the file will be found to be different from the file being checked.

Then, in step 450, the optimization module 250 may perform an optimization for the classes and methods of the file found in step 430 for the subsequent comparison with the file being checked. The optimization may include a determination of the classes and methods which will be compared in the files. Thus, the selection of which classes to compare and which methods within the classes as well to compare with each other is done by comparing their sizes. For example, the size can be determined by adding up the methods for the classes and adding up the instructions for the methods. Thus, if the size differs by more than 25% when comparing the classes or methods, no further analysis of them will be performed. Otherwise, if the size differs by less than 25%, they will be compared.

Moreover, in step 470, a limiting of the number of vectors (points) being compared may be done in the direct comparison of the vectors found in step 450 (of the methods in the corresponding classes) of the files. For example, the limitation can be established by a certain range in space, such that only vectors (points) will be compared which fall within this range. After this, the final comparison of the files is done in step 490.

Figure 6:
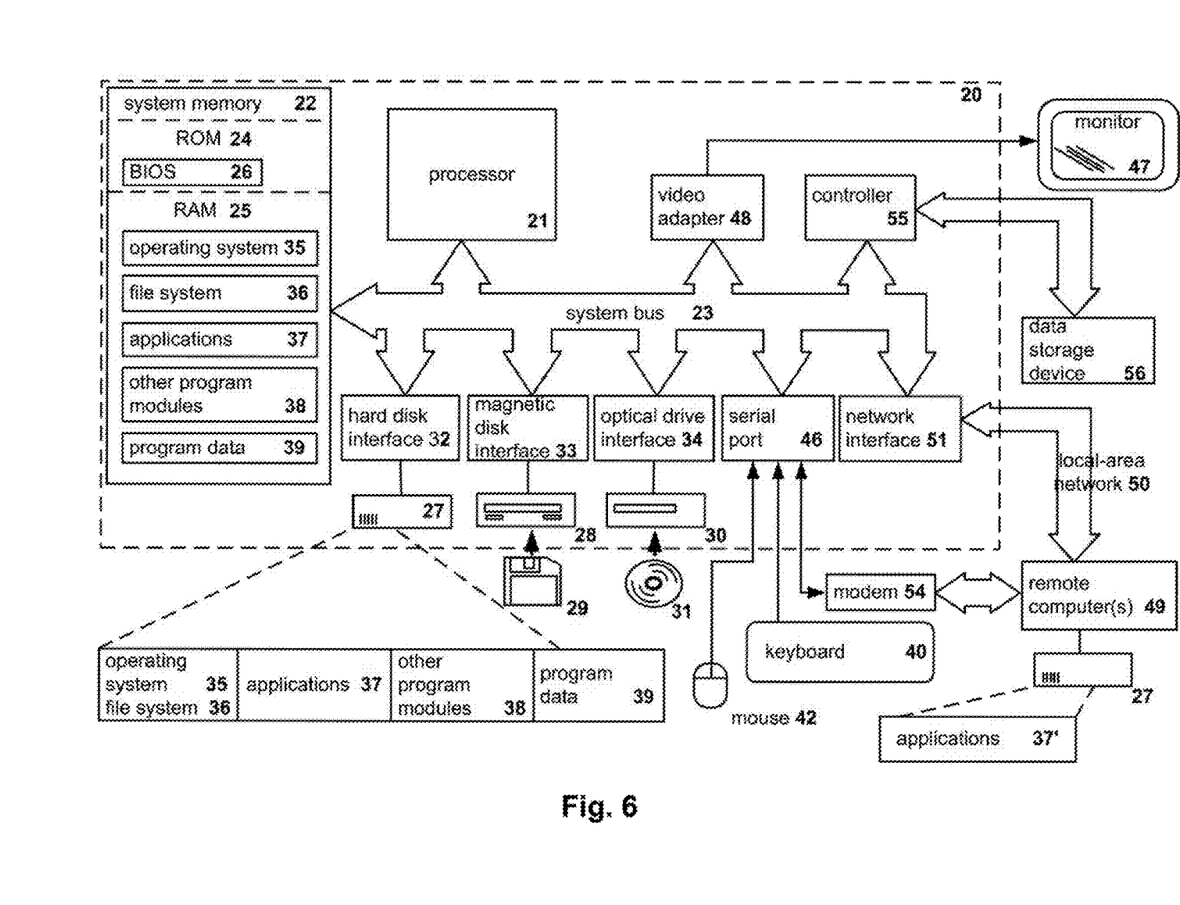
FIG. 6 illustrates an example of a general-purpose computer system can which the disclosed systems and method can be implemented.

FIG. 6 illustrates an example of a general-purpose computer system (which may be a personal computer or a server) on which the disclosed systems and method can be implemented according to an example aspect.

As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 6. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 45. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of detecting malicious files, the method comprising:
analyzing, by a hardware processor, a file comprising code written in an object-oriented program language to identify at least one or more classes of the analyzed file and one or more methods contained in said one or more classes;
determining, by the hardware processor, a number of the identified one or more classes and a number of the identified one or more methods of the analyzed file;

identifying, by the hardware processor, a bytecode array for each identified method;
determining, by the hardware processor, instructions contained in each method by identifying a corresponding operation code from the bytecode array of each method;
dividing, by the hardware processor, the determined instructions for each method into a plurality of groups based on similarity of functionality among said instructions;
forming, by the hardware processor, a vector for each method on the basis of the results of the division of the instructions into the plurality of groups, the vector for each method including a point in n-dimensional Euclidean space;
comparing at least one of the number of classes and the number of methods of the analyzed file to known malicious files in a database to identify the known malicious files for comparison that have at least one of a number of classes and a number of methods that differs less than a predetermined percentage than the number of classes and the number of methods, respectively, of the analyzed file;
comparing, by the hardware processor, the formed vectors for the methods of the analyzed file with a plurality of vectors of the identified known malicious files for comparison to determine a degree of similarity between the compared vectors; and
determining, by the hardware processor, whether the analyzed file is malicious or clean based on the degree of similarity between the compared vectors.

2. The method of claim 1, wherein analyzing a file includes one or more of disassembling and decompiling the file.

3. The method of claim 1, wherein the instructions are divided into groups on the basis of semantic values of the bytecode arrays.

4. The method of claim 1, wherein the plurality of groups include one or more groups of: instructions having no logical meaning, instructions that work with constants, instructions that work with fields, instructions that pertain to calls or intercepts.

5. The method of claim 1, wherein comparing vectors includes comparing the distance between their two associated points in n-dimensional Euclidean space.

6. The method of claim 1, wherein comparing vectors includes performing one or more of:
excluding from the comparison classes and methods belonging to standard library packages;
excluding from the comparison classes not containing a single method;
excluding from the comparison methods containing two instructions or less; and
excluding from the comparison the vectors of methods only contained in a single class.

7. A system of detecting malicious files, the system comprising:
a hardware processor configured to:
analyze a file comprising code written in an object-oriented program language to identify at least one or more classes of the analyzed file and one or more methods contained in said one or more classes;
determine a number of the identified one or more classes and a number of the identified one or more methods of the analyzed file;
identify a bytecode array for each identified method;
determine instructions contained in each method by identifying a corresponding operation code from the bytecode array of each method;
divide the determined instructions for each method into a plurality of groups based on similarity of functionality among said instructions;
form a vector for each method on the basis of the results of the division of the instructions into the plurality of groups, the vector for each method including a point in n-dimensional Euclidean space;
compare at least one of the number of classes and the number of methods of the analyzed file to known malicious files in a database to identify the known malicious files for comparison that have at least one of a number of classes and a number of methods that differs less than a predetermined percentage than the number of classes and the number of methods, respectively, of the analyzed file;
compare the formed vectors for the methods of the analyzed file with a plurality of vectors the identified known malicious files for comparison to determine a degree of similarity between the compared vectors; and
determine whether the analyzed file is malicious or clean based on the degree of similarity between the compared vectors.

8. The system of claim 7, wherein analyzing a file includes one or more of disassembling and decompiling the file.

9. The system of claim 7, wherein the instructions are divided into groups on the basis of semantic values of the bytecode arrays.

10. The system of claim 7, wherein the plurality of groups include one or more groups of: instructions having no logical meaning, instructions that work with constants, instructions that work with fields, instructions that pertain to calls or intercepts.

11. The system of claim 7, wherein comparing vectors includes comparing the distance between their two associated points in n-dimensional Euclidean space.

12. The system of claim 7, wherein comparing vectors includes performing one or more of:
excluding from the comparison classes and methods belonging to standard library packages;
excluding from the comparison classes not containing a single method;
excluding from the comparison methods containing two instructions or less; and
excluding from the comparison the vectors of methods only contained in a single class.

13. A non-transitory computer readable medium storing computer executable instructions for detecting malicious files, including instructions for:
analyzing a file comprising code written in an object-oriented program language to identify at least one or more classes of the analyzed file and one or more methods contained in said one or more classes;
determining a number of the identified one or more classes and a number of the identified one or more methods of the analyzed file;
identifying a bytecode array for each identified method;
determining instructions contained in each method by identifying a corresponding operation code from the bytecode array of each method;
dividing the determined instructions for each method into a plurality of groups based on similarity of functionality among said instructions;

forming a vector for each method on the basis of the results of the division of the instructions into the plurality of groups, the vector for each method including a point in n-dimensional Euclidean space;

comparing at least one of the number of classes and the number of methods of the analyzed file to known malicious files in a database to identify the known malicious files for comparison that have at least one of a number of classes and a number of methods that differs less than a predetermined percentage than the number of classes and the number of methods, respectively, of the analyzed file;

comparing the formed vectors for the methods of the analyzed file with a plurality of vectors of the identified known malicious files for comparison to determine a degree of similarity between the compared vectors; and determining whether the analyzed file is malicious or clean based on the degree of similarity between the compared vectors.

14. The non-transitory computer readable medium of claim 13, wherein analyzing a file includes one or more of disassembling and decompiling the file.

15. The non-transitory computer readable medium of claim 13, wherein the instructions are divided into groups on the basis of semantic values of the bytecode arrays.

16. The non-transitory computer readable medium of claim 13, wherein the plurality of groups include one or more groups of: instructions having no logical meaning, instructions that work with constants, instructions that work with fields, instructions that pertain to calls or intercepts.

17. The non-transitory computer readable medium of claim 13, wherein comparing vectors includes comparing the distance between their two associated points in n-dimensional Euclidean space.

18. The non-transitory computer readable medium of claim 13, wherein comparing vectors includes performing one or more of:
excluding from the comparison classes and methods belonging to standard library packages;
excluding from the comparison classes not containing a single method;
excluding from the comparison methods containing two instructions or less; and
excluding from the comparison the vectors of methods only contained in a single class.

* * * * *